United States Patent
Bae

(10) Patent No.: US 10,235,520 B2
(45) Date of Patent: Mar. 19, 2019

(54) SYSTEM AND METHOD FOR ANALYZING PATCH FILE

(71) Applicant: SOFTCAMP CO., LTD., Seoul (KR)

(72) Inventor: Steve Bae, Gyeonggi-do (KR)

(73) Assignee: SOFTCAMP CO., LTD., Seoul (KR)

( * ) Notice: Subject to any disclaimer, the term of this patent is extended or adjusted under 35 U.S.C. 154(b) by 0 days.

(21) Appl. No.: 15/312,028

(22) PCT Filed: Mar. 23, 2015

(86) PCT No.: PCT/KR2015/002797
§ 371 (c)(1),
(2) Date: Nov. 17, 2016

(87) PCT Pub. No.: WO2015/178578
PCT Pub. Date: Nov. 26, 2015

(65) Prior Publication Data
US 2017/0076094 A1    Mar. 16, 2017

(30) Foreign Application Priority Data
May 22, 2014    (KR) ........................ 10-2014-0061759

(51) Int. Cl.
*G06F 21/00*    (2013.01)
*G06F 21/56*    (2013.01)
*G06F 21/57*    (2013.01)
*G06F 21/55*    (2013.01)

(52) U.S. Cl.
CPC ............ *G06F 21/56* (2013.01); *G06F 21/554* (2013.01); *G06F 21/562* (2013.01); *G06F 21/564* (2013.01); *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 2010/0169969 A1* | 7/2010 | Klein | G06F 9/328 726/22 |
| 2010/0223306 A1* | 9/2010 | Liu | G06F 9/44505 707/822 |
| 2012/0030762 A1* | 2/2012 | Klein | G06F 21/554 726/23 |

* cited by examiner

*Primary Examiner* — Eleni A Shiferaw
*Assistant Examiner* — Andre J Steinle
(74) *Attorney, Agent, or Firm* — IPLA P.A.; James E. Bame

(57) ABSTRACT

A system and method for analyzing a patch file determine the similarity between a patch file of an application program and an existing file in terms of an operation pattern and a file type and also determine whether risky behavior is performed by the patch file, thereby detecting a file disguised as a patch file. The system for analyzing a patch file includes: a program analysis module configured to collect setup information configured in an application program and generate the collected information as reference information; a reference information database (DB) configured to store the reference information; a patch file analysis module configured to generate setup information configured in a patch file of the application program as patch information by analyzing the patch file; and a comparison module configured to search for reference information and compare the patch information with the reference information.

4 Claims, 4 Drawing Sheets

SYSTEM AND METHOD FOR ANALYZING PATCH FILE

BACKGROUND

The present invention relates to a system and method for analyzing a patch file, which can detect malware, a computer virus, a back door, a function degradation code, etc. contained a patch file of an application program by determining the similarity between the patch file of the application program and an existing file in terms of an operation pattern and a file type and additionally determining whether high risk level behavior is performed by the patch file.

In the field of computer technology, patching refers to an operation of correcting a failure in various types of application programs or data installed on a computer or the like, or an operation of changing the existing information of an application program or data into the newest information. Accordingly, various types of application programs installed on a computer are patched through the installation of patch files periodically provided, and thus a user can stably use the corresponding application programs via patching.

Meanwhile, with the development of social engineering attacks, there occur many cases where a serious failure is caused to a system on which a corresponding patch file has been installed by distributing malware as if the malware were a normal patch file, by including a patch file infected with malware, or by including a backdoor.

Despite this serious situation, conventionally, there is no method for determining whether an update file (a patch file) for a specific application program is a patch file provided by the corresponding manufacturer of the application program, with the result that computers are frequently infected with malware by patch files.

To overcome the above-described problem, conventional vaccine programs identify the operation pattern of malware or the like, and, when the corresponding operation pattern has been identified, consider that infection with malware has occurred and cure the infection.

However, the conventional vaccine programs determine only whether a patch file is malware, and cannot determine whether the corresponding patch file is a normal patch file manufactured by a corresponding manufacturer. Furthermore, when there is no information about an operation pattern, it cannot be determined whether infection with malware has occurred, and the determination of whether infection has occurred is focused on only the analysis of an operation pattern. A problem still remains in that the conventional vaccine programs cannot detect new types of malware based on a logic bomb, a hidden code, or the like.

SUMMARY OF THE INVENTION

Accordingly, the present invention is devised to overcome the above-described problems, and an object of the present invention is to provide a system and method for analyzing a patch file, which enable a user to determine whether a patch file of an application program is a normal patch file by determining the similarity between the corresponding patch file and an existing normal application program file in terms of an operation pattern and a file type and additionally identifying the risky behavior of the patch file.

In order to accomplish the above object, the present invention provides a system for analyzing a patch file, the system including:

a program analysis module configured to collect setup information configured in an application program and generate the collected information as reference information;

a reference information database (DB) configured to store the reference information;

a patch file analysis module configured to generate setup information configured in a patch file of the application program as patch information by analyzing the patch file of the application program; and a comparison module configured to search for reference information, corresponding to the patch information, in the reference information DB and compare the patch information with the reference information.

According to the present invention, it can be determined that new risky behavior, such as a change in file type, the invocation of a new API, or the like, is contained by comparing reference information, collected from a setup file and existing patch file of an application program, with the patch information of a new patch file, thereby providing the effect of preventing a risky patch file from being installed during a patching process.

DETAILED DESCRIPTION OF THE INVENTION

Figure 1:
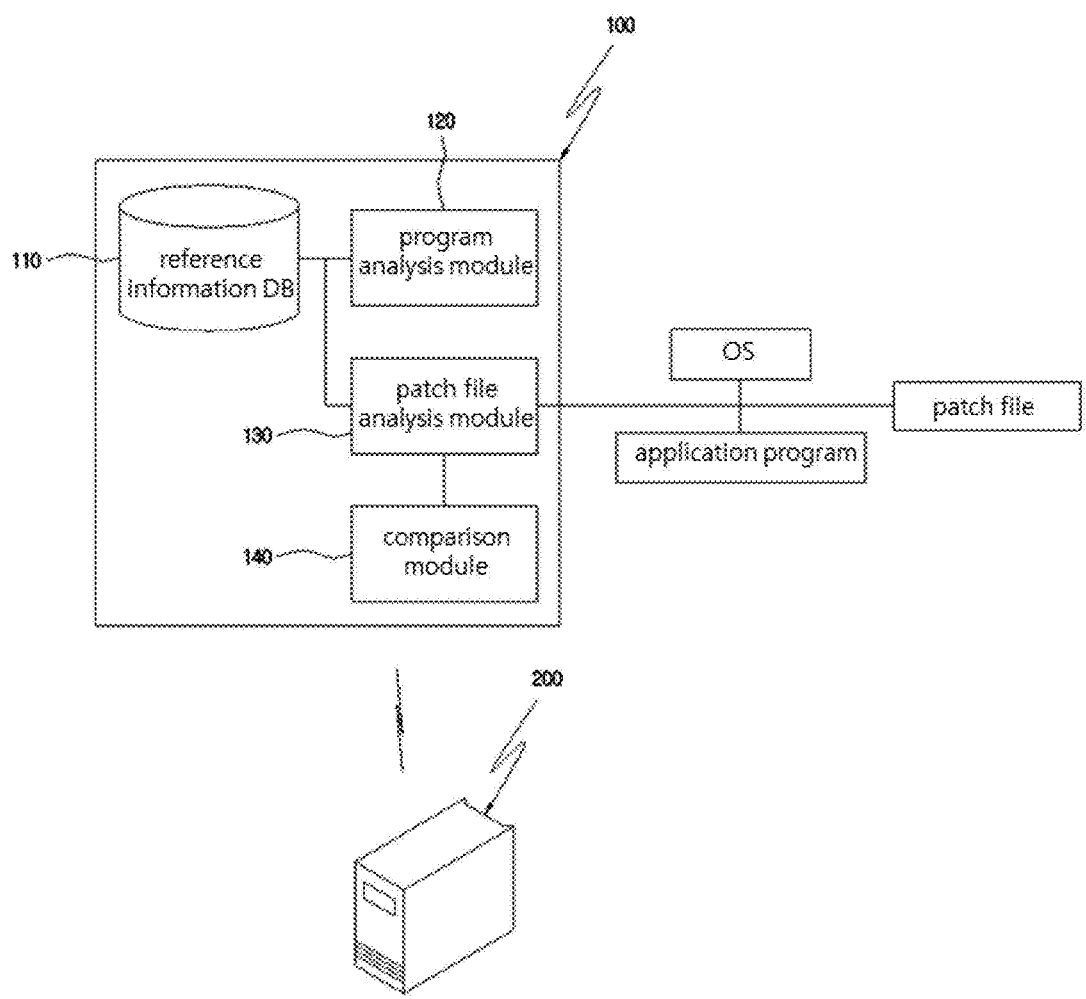
FIG. 1 is a block diagram showing the configuration of an analysis system according to the present invention.

The features and advantages of the above-described present invention will be apparent via the following detailed description that will be given in conjunction with the accompanying drawings. Those having ordinary knowledge in the art to which the present invention pertains can easily practice the technical spirit of the present invention based on the detailed description. The present invention may be subjected to various modifications, and may have various forms. Specific embodiments will be illustrated in the drawings, and will be described in the specification in detail. However, this is not intended to limit the present invention to the disclosed specific embodiments. It should be appreciated that all modifications, equivalents and substitutions included in the spirit and technical scope of the present invention are encompassed. The terms used herein are merely used to illustrate the specific embodiments, and are not intended to limit the present invention.

Detailed content required to practice the present invention will be described in detail below with reference to the accompanying diagrams.

FIG. 1 is a block diagram showing the configuration of an analysis system according to the present invention. The following description will be given with reference to FIG. 1.

Generally, a patch file does not include a code that considerably modifies the function of an existing program or that accesses a sensitive area of a system without permission.

The concept of the basic operation of the analysis system 100 according to the present invention is that, when it is determined based on the above-described characteristic of a patch file that there is the code of a new patch file that deviates from the operation of an existing program or that newly accesses a sensitive area of a system, the analysis system 100 inspects the new patch file, and notifies a user of the result of the analysis.

The analysis system 100 according to the present invention is configured to analysis an existing program, to store system invocation information, to manage a risk knowledge base in which related data accessing a sensitive area of a system has been stored, and to analyze a difference between a new patch file and an existing program and new access to the sensitive area of the system by analyzing the new patch file.

For this purpose, the analysis system 100 according to the present invention includes: a program analysis module 120 configured to collect the setup information of an application program for a specific terminal (file type information, operation pattern information, etc. that belong to the application program) and set the setup information as reference information; a reference information DB 110 configured to store the reference information; a patch file analysis module 130 configured to analyze a patch file of the application program, collect analysis information, such as file type information, operation pattern information, etc., and set the analysis information as patch information; and a comparison module 140 configured to compare the reference information of the application program with the patch information.

The reference information DB 110 stores setup information composed of a normal patch file (the file type information, operation pattern information, etc. of each file) as well as the setup information of the application program as the reference information, as described above.

The program analysis module 120 generates the reference information. In an embodiment according to the present invention, the reference information is generated by analyzing the setup information of the application program (file type information, operation pattern information, etc.) as described above, which will be described in greater detail.

First, the type information is reference information obtained by analyzing the processing element (PE) structure change of a configuration file including the setup file of the corresponding application program. Whether malware is present or a difference with existing setup information can be determined through the analysis of the PE header of the setup file.

Next, the operation pattern information is performed via static analysis and dynamic analysis (debugging).

The static analysis is performed to identify and record a history of the invocation of an API or a service function for an OS in the state in which the setup file of the application program has not been executed. In greater detail, a static analysis technology infers information about the operation of software based on the static representation of the software. This technology is contrasted with dynamic analysis technology that collects information by observing the operation of the software when the software is operated. A test case is not required because analysis is performed in the state in which code has not been executed. The static analysis undergoes a two-step process. At a first step, semantic information is extracted from the binary file of the software. At a second step, a defect or another desired characteristic is found by using the above information.

The dynamic analysis dynamically identifies and records a history of the invocation of an API or a service function for an OS in the state in which the setup file has been executed. Via the static analysis or dynamic analysis, a list of APIs and service functions invoked and loaded in the corresponding application program may be identified, and a list of APIs and service functions newly added by a patch file may be identified.

For reference, details about resources (a file, a registry, etc.) used for each function may be identified via the static analysis and the dynamic analysis, through which the reference information is generated. For example, a Createfile function is a function of generating or opening a file and an I/O device, which is chiefly used to access a specific file and I/O device by a patch file. The program analysis module 120 designates a parameter of the Createfile function as an "access target file," and includes a list of files, accessed by the Createfile function during the installation of a setup file, in the reference information. Thereafter, when it is determined that a patch file of the corresponding application program is a normal patch file, a list of files accessed by the Createfile function during a patch process may be continuously updated in the reference information DB 110.

As described above, the program analysis module 120 identifies the file type information and operation pattern information of the application program file, generates reference information, and stores the generated reference information in the reference information DB 110.

The patch file analysis module 130 collects the file type information, operation pattern information, etc. of the patch file of the corresponding application program, and generates the collected information as patch information. Information corresponding to the type information and operation pattern information of a file, i.e., reference information, may be collected as the patch information. As an example, the patch information may include an invocation list invoked from an OS during patching in accordance with an API list or a service function list illustrated in the operation pattern information together with the file type information of the reference information.

The comparison module 140 searches for the reference information of the corresponding application program in the reference information DB 110, and compares the patch information, generated by the patch file analysis module 130, with the reference information.

When there is a difference between the reference information and the patch information as a result of the comparison, the corresponding result may be output as a result report in various formats (doc, pdf and html formats and the like). Thereafter, the risk level of the patch information may be additionally determined, and may be included in the result report. Thereafter, an administrator quires the manufacturer 200 of the corresponding application program to determine based on the result report whether the patch file is a normal file distributed by the manufacturer 200. When a response in which the corresponding patch file is normal is received from the manufacturer 200, the reference information is updated with the patch information of the patch file, and the patching of the corresponding file is performed. Since an existing well-known, commonly used patch technology is applied as a patch method, a detailed description thereof is omitted.

A patch analysis method according to the present invention will be described with reference to the above-described content.

Figure 2:
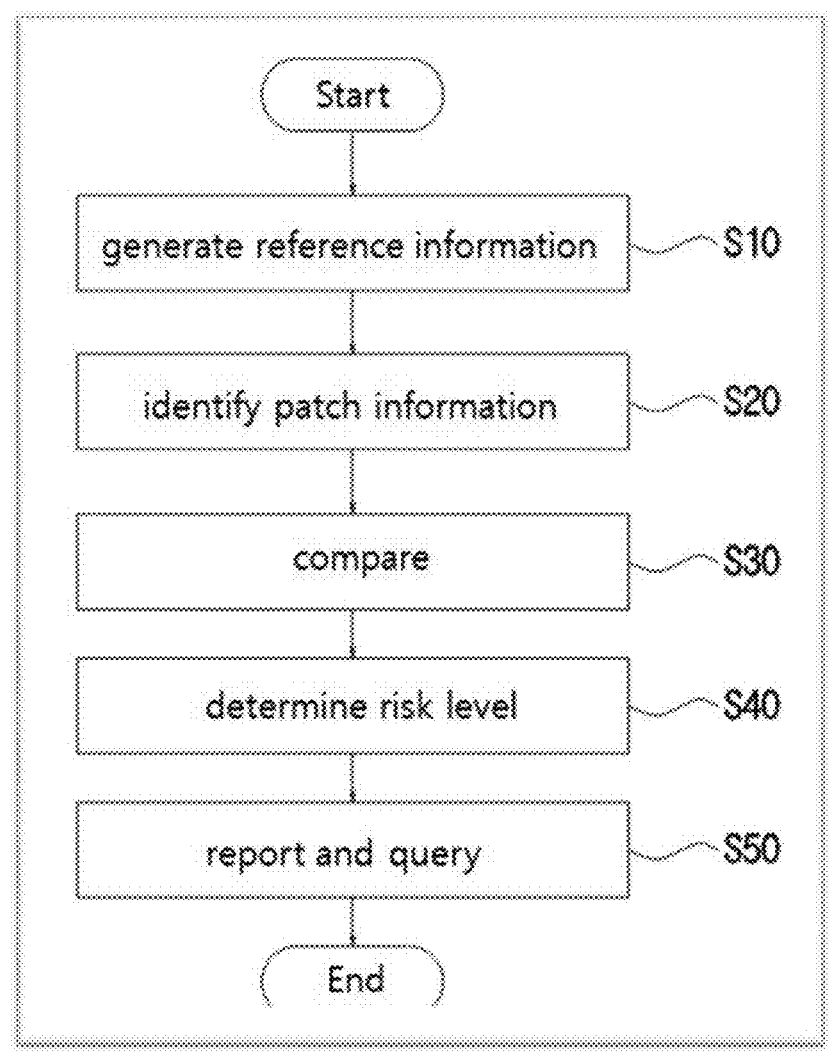
FIG. 2 is a flowchart sequentially showing an analysis method using the analysis system according to the present invention.

FIG. 2 is a flowchart sequentially showing an analysis method using the analysis system according to the present invention. The following description is given with reference to FIG. 2.

S10: Reference Information Generation Step

An administrator sets the configuration information of the setup file (for example, an installation file) of a specific application program as reference information by inputting the configuration information of the setup file of the specific application program to the program analysis module 120 as input data. Furthermore, when there is a normal patch file, the configuration information of the patch file is also input to the program analysis module 120 as input data, and the reference information is supplemented with the configuration information of the patch file.

The program analysis module 120 identifies information about the input setup file of the application program and a normal patch file, and generates the identified information as the reference information of the corresponding application program. As described above, the reference information includes the type information and operation pattern information of the setup file and the normal patch file. Since the technology by which the program analysis module 120 collects the type information and the operation pattern information has been described above, a detailed description thereof is omitted.

S20: Patch Information Identification Step

The patch file analysis module 130 collects the file type information and operation pattern information of a patch file for the new patching of the corresponding application program, and generates the collected information as patch information. The patch information may be collected in accordance with the type information and operation pattern information of the file, i.e., the reference information. The patch information may include an invocation list invoked from an OS during patching in accordance with an API list or a service function list illustrated in the operation pattern information together with the file type information of the reference information.

S30: Comparison Step

In general, for an application program to run, an API that is provided by an OS must be invoked. Generally, there is no significant difference in a history of the invocation of APIs for an OS by the application program before and after patching. Accordingly, when the patch file performs new API invocation absent in the history of the invocation of APIs by the existing application program, the patch file may be classified as a target that requires the determination of whether the patch file is a normal patch provided by the manufacturer 200. For example, a representative API that is used by malware, such as a virus, to occupy a resource of another process is CreateRemoteThread. CreateRemoteThread is an API function that generates a thread that is executed by another process, and is used when being executed under the authority of the other process. Furthermore, the injection of another DLL may be performed via a CreateRemteThread API. Accordingly, the operation of another DLL may be bypassed or incapacitated by using CreateRemteThread. Based on this, when the CreateRemteThread API had not been used in the reference information and the corresponding API has been added to the patch information, this may be classified as a risk. Furthermore, to access an MBR (a master boot record), a hard disk should not be accessed on a per file basis, and must be physically accessed. In this case, the parameter of the invocation of the CreateFile API is changed into the form of CreateFile (\\\\.\\PhysicalDrive0, . . . ). A critical API adapted to destroy or infect the system, and a parameter, a driver, a service, a network, etc. used during the invocation of the API are all included in the reference information, and the patch information attributable to the patch file is compared with the reference information. For example, when, as a result of the analysis of the cumulative previous patch information of a specific application program for comparison of a patch of the corresponding application program, the invocation of CreateRemteThread that could not be identified in the reference information (including an existing patch file) is identified in the patch information, it may be suspected that the corresponding patch file is not a normal patch file provided by the manufacturer 200.

As described above, the comparison module 140 determines whether there is a difference by comparing the patch information generated by the patch file analysis module 130 with the reference information of the corresponding application program. For this purpose, the comparison module 140 searches for the reference information of the application program related to the corresponding patch file in the reference information DB 110, and compares the found reference information with the patch information.

Additionally, for the invocation of an API or a service item, a parameter may be tracked and compared with the reference information of the application program via a disassembler. For example, when an invoked API or service item in the patch of the patch file does not access a resource required for the execution of the corresponding application program but accesses a resource of another application program that could not be identified in the reference information or a system resource, it may be compared with the reference information, and may be considered to be a "risk" depending on the importance of the resource at the following risk determination step S40. For reference, examples of the critical system resource include physical READ/WRITE (R/W) from and to a disk, such as an MBR or the like, device driver loading, system service loading, API message hooking, host file forging, network communication, etc.

As described above, when the patch information is different from existing information, the comparison module 140 records information about the difference in a result report.

Figure 3:
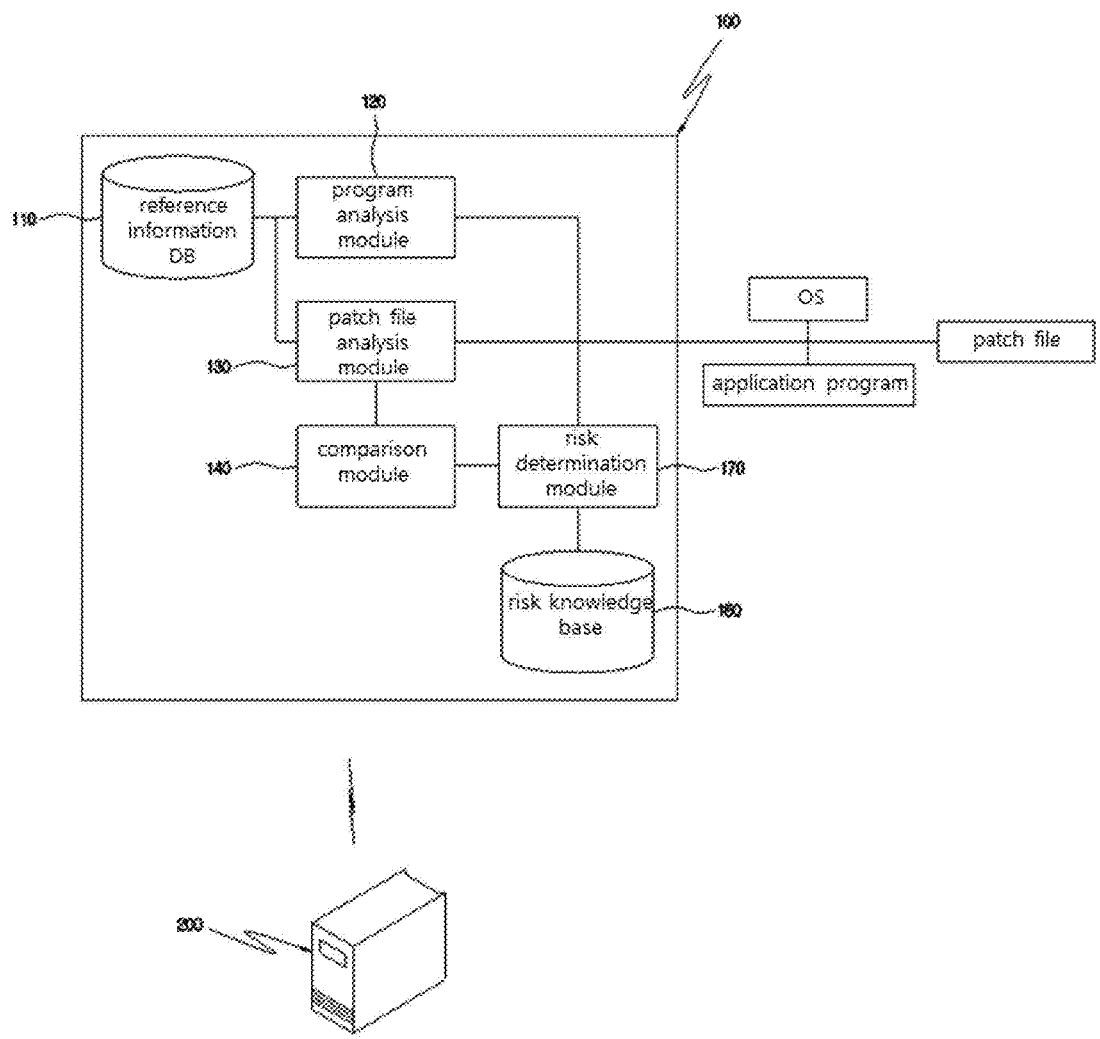
FIG. 3 is a block diagram showing another embodiment of an analysis system according to the present invention.
Figure 4:
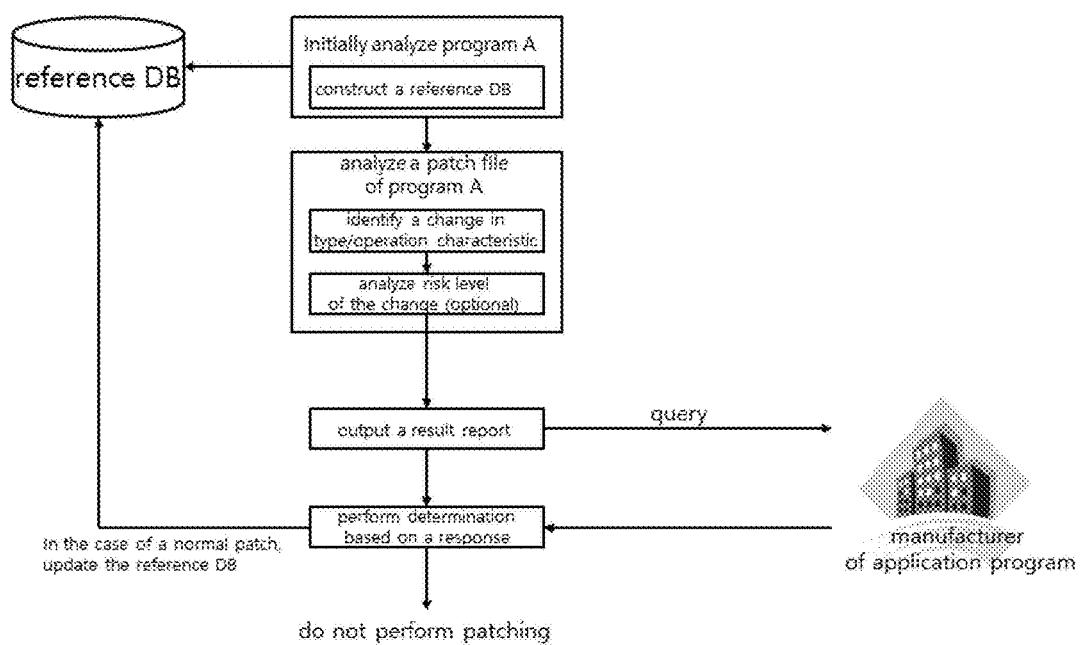
FIG. 4 is a flowchart schematically showing a process of performing patching according to the present invention.

FIG. 3 is a block diagram showing another embodiment of an analysis system according to the present invention, and FIG. 4 is a flowchart schematically showing a process of performing patching according to the present invention. The analysis system and method according to the present invention will be described with reference to FIGS. 3 and 4, together with FIG. 2.

S40: Risk Determination Step

When the comparison module 140 determines that the patch information generated by the patch file analysis module 130 is different in operation pattern information or file type from the reference information of the corresponding application program, the risk determination module 170 searches for the risk level of the corresponding patch information in the risk knowledge base 160, and outputs the risk level of the patch file. For reference, the risk knowledge base 160 grades operation behavior for an OS or the operation behavior of the OS according to its risk level and stores the graded operation behavior, and the risk determination module 170 compares the result of the comparison between the reference information and the patch information by the comparison module 140 with the operation behavior of the risk knowledge base 160, and searches for and outputs a corresponding risk level.

For example, the risk level may be determined by identifying a parameter that is accessed. Examples of access to a critical system resource may include access for physical READ/WRITE (R/W) from and to a disk PhysicalDevice0, such as an MBR or the like, device driver loading, system service loading, API message hooking, host file forging, network communication, etc. That is, when network communication with another IP address that could not be identified in the reference information is added to corresponding patch information, a corresponding patch may be considered to be a "risk." Furthermore, when the parameter of a CreateFile function, i.e., a function used when access to a file is made and R/W is performed, is PhysicalDrive0, this is access to an MBR area required for the booting of a system, and thus the corresponding patch is considered to be a "risk." Furthermore, when a file having a name identical to that of a shared file (for example, EXE.dll, ntdll.dll, kernel32.dll, or the like) used for the operation of an OS, such as Windows, is generated or hacking information adapted to change a name is identified in corresponding hacking, the corresponding patch is also considered to be a "risk" via comparison with the reference information. For reference, a shared file of an OS (for example, Windows), such as ntdll.dll, is a component that is used when all application programs run. When this file is damaged, not only the OS itself but also an application program previously installed on the computer cannot run normally.

S60: Report and Query Step

Based on the result report obtained at the above step, an administrator queries the manufacturer 200 to determine whether the patch file is a normal patch file provided by the corresponding application program manufacturer 200. When it is determined that the corresponding patch file is a normal patch file provided by the manufacturer 200, patching is performed by using an existing method, and the reference information is updated with the corresponding patch information. When the corresponding patch file is a disguised patch file not provided by the manufacturer 200, measures are taken not to perform patching.

Although the above detailed description of the present invention has been given with reference to preferred embodiments of the present invention, it will be appreciated by those skilled in the art or those having ordinary knowledge in the art that the present invention may be modified and altered in various manners within the range that does not apart from the technical spirit and technical scope of the present invention described in the attached claims.

The invention claimed is:

1. A system for analyzing a patch file, the system comprising: a memory storage storing program code; and one or more processors coupled to the memory storage, the program code which, when executed by the one or more processors, cause the system to implement a program analysis module configured to collect file type information and operation pattern information that are setup information of an application program installed on a computer, to generate the collected information as reference information, and to run based on an operating system (OS) installed on the computer, wherein the file type information is obtained by collecting a processing element (PE) structure change information list of a file included in the application program, and the operation pattern information is history information determined by identifying selected one or more of a history of an application program interface (API) invocation of the OS and a history of invocation of a service function in a state in which a setup file of the application program is not executed;

a reference information database (DB) configured to store the reference information;

a patch file analysis module configured to collect file type information and operation pattern information for a patch file of the application program, to generate the collected information as patch information, and to run based on the OS installed on the computer; and a comparison module configured to search for reference information for the patch file, among files included in the application program, in the reference information DB, to determine whether a difference is present between the corresponding reference information and the patch information, and to run based on the OS installed on the computer.

2. The system of claim 1, further comprising:

a risk knowledge base configured to grade operation behavior of accessing a resource in response to execution of the patch file according to its risk level, and to store the graded operation behavior; and a risk determination module configured to determine whether a difference is present between the patch information and the reference information, and to, if it is determined that a difference is present, identify the resource that is accessed by the execution of the patch file, and search for a risk level corresponding to the operation behavior stored in the risk knowledge base.

3. The system of claim 1, wherein the patch information is obtained by collecting selected one or more of an API invocation list and a service function invocation list before and after installation of the patch file.

4. The system of claim 3, wherein the reference information comprises static analysis information identified by extracting semantic information from a binary file of the application program, and the patch information comprises static analysis information identified by extracting semantic information from a binary file of the patch file.

* * * * *